US012723733B2

(12) United States Patent
Shiosaka et al.

(10) Patent No.: US 12,723,733 B2
(45) Date of Patent: Sep. 1, 2026

(54) HEAT EXHAUST STRUCTURE FOR HEADLAMP

(71) Applicant: SUZUKI MOTOR CORPORATION, Hamamatsu (JP)

(72) Inventors: Taku Shiosaka, Hamamatsu (JP); Ryoji Tanaka, Hamamatsu (JP)

(73) Assignee: SUZUKI MOTOR CORPORATION, Hamamatsu (JP)

( * ) Notice: Subject to any disclaimer, the term of this patent is extended or adjusted under 35 U.S.C. 154(b) by 0 days.

(21) Appl. No.: 19/219,791

(22) Filed: May 27, 2025

(65) Prior Publication Data

US 2026/0016137 A1 Jan. 15, 2026

(30) Foreign Application Priority Data

Jul. 11, 2024 (JP) ................................ 2024-111729

(51) Int. Cl.

*F21S 45/47* (2018.01)
*F21S 45/49* (2018.01)
*F21W 107/17* (2018.01)

(52) U.S. Cl.

CPC ............... *F21S 45/47* (2018.01); *F21S 45/49* (2018.01); *F21W 2107/17* (2018.01)

(58) Field of Classification Search

CPC .. F21S 45/49; F21S 45/42; F21S 45/43; F21S 45/33; B60Q 1/04; B60Q 1/0408; B62D 35/00; B62D 25/084; F21W 2103/15; F21W 2102/19

See application file for complete search history.

(56) References Cited

U.S. PATENT DOCUMENTS

| | | | | | |
|---|---|---|---|---|---|
| 4,709,774 | A * | 12/1987 | Saito | B62J 17/02 180/68.1 |
| 2007/0127257 | A1* | 6/2007 | Erion | F21V 29/677 362/547 |
| 2018/0264993 | A1 | 9/2018 | Takenaka et al. | B60Q 1/0408 |

FOREIGN PATENT DOCUMENTS

| | | | | |
|---|---|---|---|---|
| JP | S5830788 | Y2 * | 7/1983 | |
| JP | 2533296 | B2 * | 9/1996 | B62J 17/02 |
| JP | 2008123756 | A * | 5/2008 | F21S 41/148 |
| JP | 6490728 | B2 | 3/2019 | |

OTHER PUBLICATIONS

Search English translation of JP-2008123756-A (Year: 2008).*
Search English translation of JP S5830788 Y2 (Year: 1983).*
Search English translation of JP-2533296-B2 (Year: 1996).*

* cited by examiner

*Primary Examiner* — Omar Rojas Cadima
(74) *Attorney, Agent, or Firm* — Stein IP, LLC

(57) ABSTRACT

A heat exhaust structure for a headlamp configured to illuminate the front of a vehicle. The heat exhaust structure includes a lamp cover configured to cover a periphery of a lens of the headlamp, a housing configured to cover a rear surface of the headlamp from a rear side, and a front fender installed below the housing. An air intake hole is formed in a lower surface of the housing, a heat exhaust hole is formed in an upper surface of the housing, and the front fender is positioned below the air intake hole.

5 Claims, 6 Drawing Sheets

HEAT EXHAUST STRUCTURE FOR HEADLAMP

CROSS-REFERENCE TO RELATED APPLICATIONS

This application is based on and claims priority under 35 USC 119 from Japanese Patent Application No. 2024-111729 filed on Jul. 11, 2024, the entire content of which is incorporated herein by reference.

TECHNICAL FIELD

The present disclosure relates to a heat exhaust structure for a headlamp.

BACKGROUND ART

In the related art, a straddle-type vehicle in which a lens surface of a headlamp is exposed from an opening of a front cover is known (for example, refer to JP6490728B). In the headlamp described in JP6490728B, a dome-shaped outer lens is attached to a front opening of a lamp housing. A light source is installed on a rear surface of the lamp housing via a substrate, and an inner lens is installed inside the outer lens and in front of the light source. Light emitted from the light source passes through the inner lens and the outer lens, and the front of the vehicle is illuminated by the light emitted to the outside from the outer lens.

On the assumption that the headlamp is going to reach high temperature, a material having high heat resistance is used for peripheral components of the headlamp and a gap between the components is widened, which may cause an increase in the cost and the lamp size. When the gap between the components is excessively enlarged in order to improve the heat exhaust performance of the headlamp, there is a problem that foreign matter such as water and mud are likely to adhere to the headlamp easily.

SUMMARY OF INVENTION

Aspect of non-limiting embodiments of the present disclosure relates to provide a heat exhaust structure for a headlamp capable of improving heat exhaust performance while reducing adhesion of foreign matter.

Aspects of certain non-limiting embodiments of the present disclosure address the features discussed above and/or other features not described above. However, aspects of the non-limiting embodiments are not required to address the above features, and aspects of the non-limiting embodiments of the present disclosure may not address features described above.

According to an aspect of the present disclosure, there is provided a heat exhaust structure for a headlamp configured to illuminate the front of a vehicle, the heat exhaust structure including:

- a lamp cover configured to cover a periphery of a lens of the headlamp;
- a housing configured to cover a rear surface of the headlamp from a rear side; and
- a front fender installed below the housing, in which an air intake hole is formed in a lower surface of the housing,
- a heat exhaust hole is formed in an upper surface of the housing, and the front fender is positioned below the air intake hole.

BRIEF DESCRIPTION OF DRAWINGS

Exemplary embodiment(s) of the present invention will be described in detail based on the following figures, wherein.

DESCRIPTION OF EMBODIMENTS

A headlamp according to an aspect of the present disclosure illuminates the front of a vehicle. In heat exhaust structure for the headlamp, a periphery of a lens of the headlamp is covered with a lamp cover, a rear surface of the headlamp is covered with a housing, and a front fender is installed below the housing. An air intake hole is formed in a lower surface of the housing, and a heat exhaust hole is formed in an upper surface of the housing. Traveling wind enters from the air intake hole in the lower surface of the housing, and hot air is pushed out from the heat exhaust hole in the upper surface of the housing, so that the heat exhaust performance of the headlamp can be improved. Further, the front fender is located below the air intake hole of the housing, so that even if foreign matter such as water and mud is splashed up onto a front wheel, the housing is protected from the foreign matter by the front fender. The front fender prevents foreign matter from entering the housing through the air intake hole, thereby preventing foreign matter from adhering to the headlamp.

Embodiment

Figure 1:
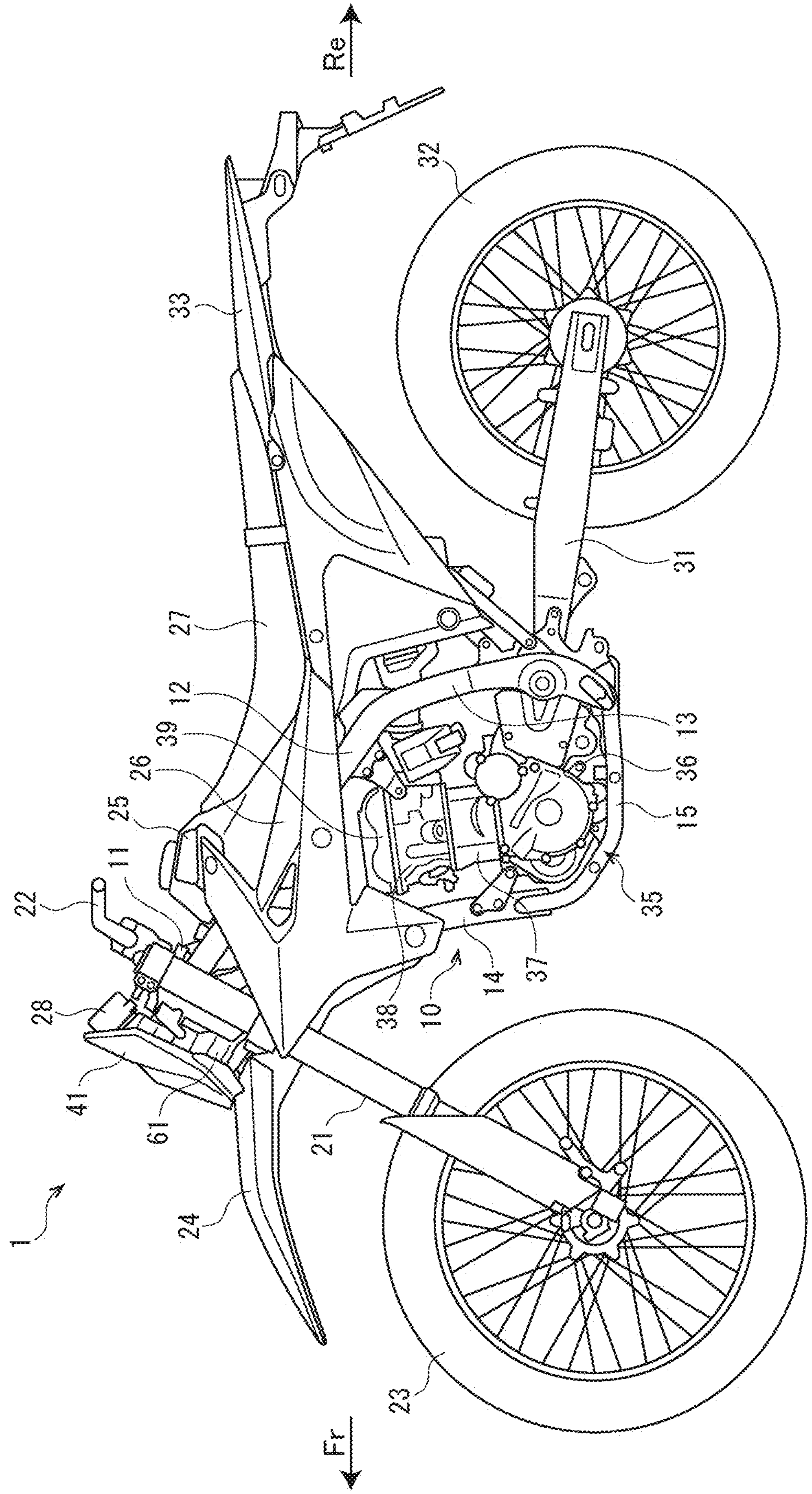
FIG. 1 is a left side view showing a vehicle internal structure according to the present embodiment.

Hereinafter, a straddle-type vehicle according to the present embodiment will be described with reference to the accompanying drawings. FIG. 1 is a left side view showing a vehicle internal structure according to the present embodiment. In the following drawings, an arrow Fr indicates a vehicle front side, an arrow Re indicates a vehicle rear side, an arrow L indicates a vehicle left side, and an arrow R indicates a vehicle right side.

As shown in FIG. 1, a straddle-type vehicle 1 is implemented by mounting various components such as an engine 35 and an electrical system on a vehicle body frame 10. A pair of main frames 12 extend obliquely rearward and downward from a head pipe 11 of the vehicle body frame 10, and rear portions of the pair of main frames 12 form a pair of body frames 13 bent downward. A down frame 14 extends downward from the head pipe 11. A pair of under loops 15 bent rearward are connected to a lower portion of the down frame 14. Rear ends of the pair of under loops 15 are connected to lower portions of the pair of body frames 13, so that the vehicle body frame 10 is formed into a cradle shape.

A front fork 21 is steerably supported on the head pipe 11 via a steering shaft (not shown). A handle 22 is provided at an upper portion of the front fork 21. A front wheel 23 is rotatably supported by a lower portion of the front fork 21.

A front fender 24 is provided on the front fork 21, and the front wheel 23 is covered from above by the front fender 24. A fuel tank 25 is placed over upper portions of the pair of main frames 12, and the main frames 12 and the fuel tank 25 are covered with a front side cover 26 from a lateral side. A seat 27 is installed behind the fuel tank 25.

A swing arm 31 is swingably supported on the body frame 13. The swing arm 31 extends rearward from the body frame 13, and a rear wheel 32 is rotatably supported at a rear end of the swing arm 31. A rear fender 33 is installed behind the seat 27, and the rear wheel 32 is covered from above by the rear fender 33. The engine 35 is a four-stroke single-cylinder engine. The engine 35 is suspended inside the vehicle body frame 10 via a plurality of suspension brackets. A cylinder assembly in which a cylinder 37, a cylinder head 38, and a cylinder head cover 39 are stacked is attached to an upper portion of a crank case 36 of the engine 35.

A housing 61 is provided in front of the head pipe 11, and a meter 28 is attached to an upper portion of the housing 61. The housing 61 is covered by the lamp cover 41 from the front, and a lens of a headlamp 51 (see FIG. 3) is exposed from an opening of a lamp cover 41. Since the headlamp 51 is covered by the lamp cover 41 and the housing 61 from the front and rear, it is necessary to improve the heat exhaust performance of the headlamp 51. Therefore, in the present embodiment, a passage for the traveling wind passing from the lower side to the upper side of the housing 61 is formed to improve the heat exhaust performance. Foreign matter such as water and mud are prevented from entering the housing 61 by the front fender 24 and the meter 28.

Figure 2:
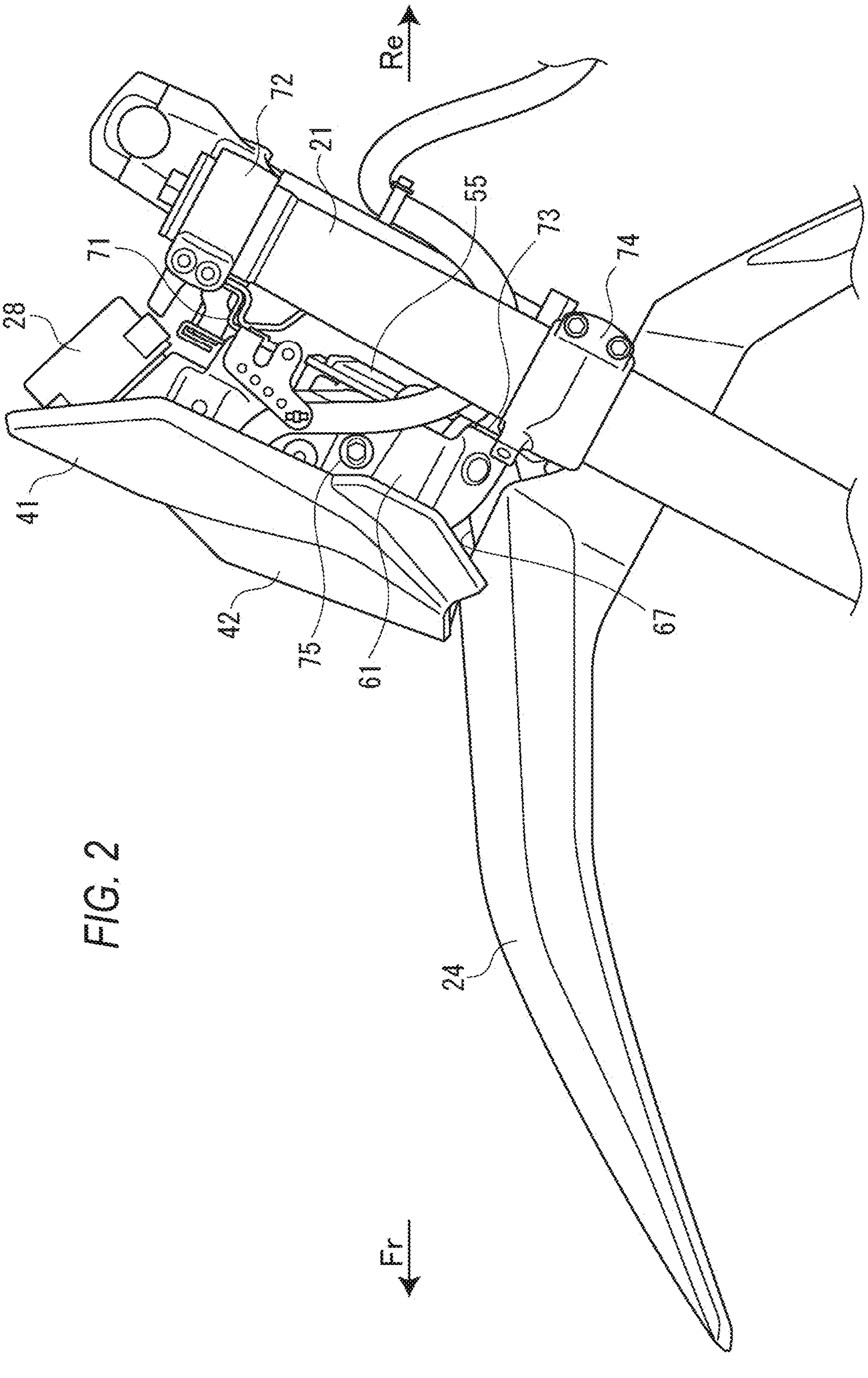
FIG. 2 is a left side view showing a periphery of a headlamp according to the present embodiment.
Figure 3:
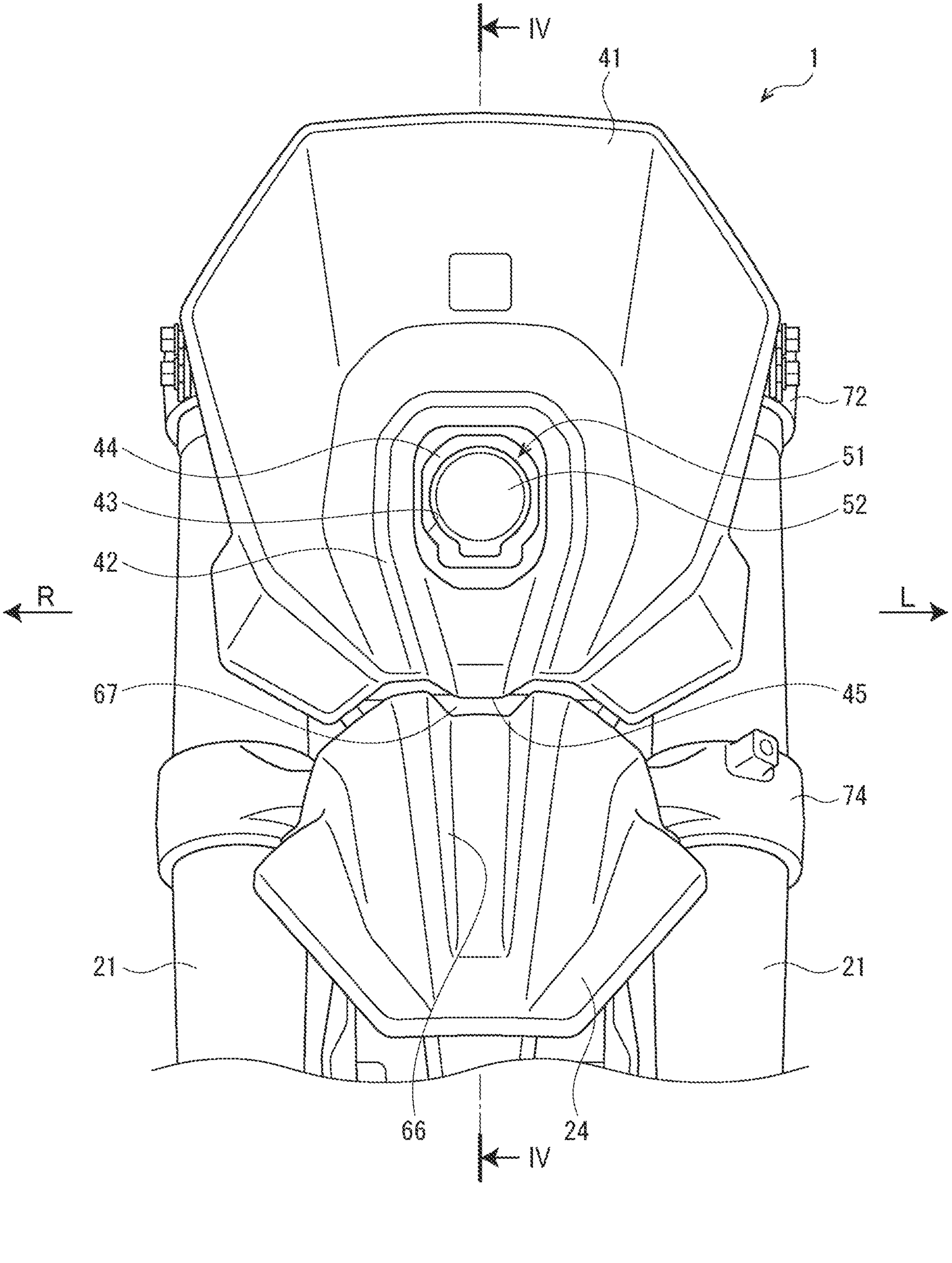
FIG. 3 is a front view showing the periphery of the headlamp according to the present embodiment.
Figure 4:
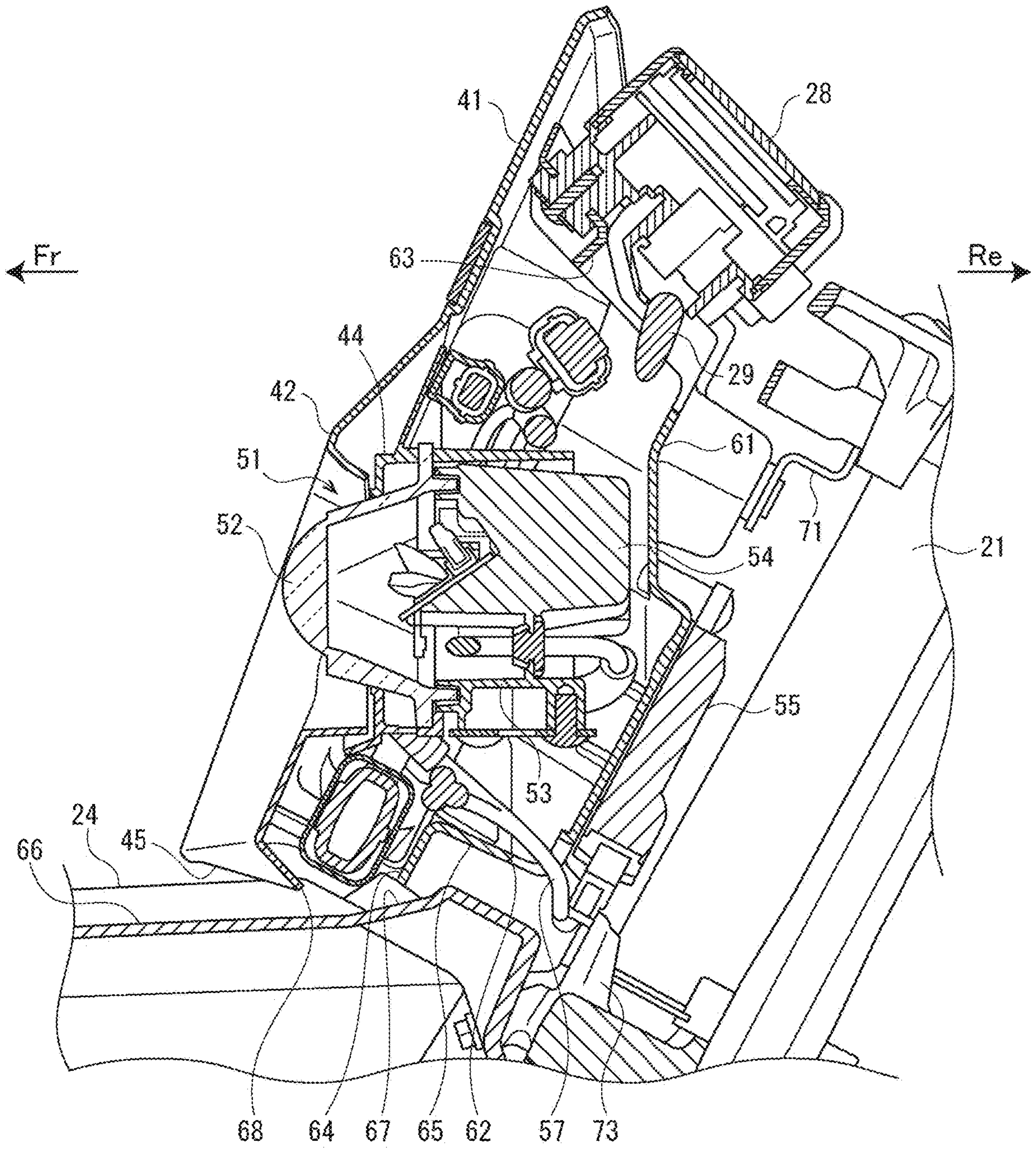
FIG. 4 is a cross-sectional view of the periphery of the headlamp in FIG. 3 taken along a line IV-IV.

The heat exhaust structure for the headlamp will be described with reference to FIGS. 2 to 4. FIG. 2 is a left side view showing a periphery of the headlamp according to the present embodiment. FIG. 3 is a front view showing the periphery of the headlamp according to the present embodiment. FIG. 4 is a cross-sectional view of the periphery of the headlamp in FIG. 3 taken along a line IV-IV.

As shown in FIGS. 2 and 3, the headlamp 51 is attached to a vehicle front portion of the straddle-type vehicle 1 to illuminate the front of the vehicle. A periphery of the lens 52 of the headlamp 51 is covered by the lamp cover 41. An inverted U-shaped bulging portion 42 is formed on a front surface of the lamp cover 41 so as to surround the upper side and both sides of the headlamp 51. A cover portion protrudes outward in a left-right direction and upward from an outer edge of the bulging portion 42, and the lens 52 of the headlamp 51 is exposed through an opening 43 inside the bulging portion 42. An annular rubber cover 44 is mounted around the headlamp 51. A gap between the opening 43 of the lamp cover 41 and the headlamp 51 is filled with the rubber cover 44.

A rear surface of the headlamp 51 is covered by the housing 61 from the rear side. The housing 61 is formed in a box shape with an open front surface, and the lamp cover 41 is attached to the housing 61 so as to cover the front of the housing 61. The meter 28 is attached to an upper surface of the housing 61, and a headlamp controller 55 is attached to a lower side of a rear surface of the housing 61. The upper portion of the housing 61 is supported by an upper bracket 72 of the front fork 21 via a support bracket 71, and a lower portion of the housing 61 is supported by a lower bracket 74 of the front fork 21 via a support bracket 73.

Further, the headlamp 51 is formed such that the optical axis is configured to be adjusted (aimed) from the outside of the housing 61. The headlamp 51 is supported inside the housing 61 via a lamp bracket (not shown) so as to be swingable in an upper-lower direction. An elongated hole (not shown) is formed in a left side surface of the housing 61, and the optical axis of the headlamp 51 is adjusted within the range of the elongated hole by an optical axis adjustment bolt 75 provided in the elongated hole. As described above, the rubber cover 44 is mounted around the headlamp 51, and the rubber cover 44 deforms in response to the swinging of the headlamp 51, so that the optical axis of the headlamp 51 can be adjusted.

The front fender 24 having a beak shape is attached to the lower bracket 74, and the front fender 24 protects the headlamp 51 and the like from foreign matter kicked up by the front wheel 23 (see FIG. 1) by. The front fender 24 is installed below the housing 61, and the lamp cover 41 and the housing 61 are covered from below by the front fender 24. In a side view, the front fender 24 curves upward from a front end toward the lamp cover 41, and a groove portion 66 is formed on an upper surface of the front fender 24 from a front end side to below the lamp cover 41. A slope 67 is formed behind the groove portion 66 of the front fender 24.

As shown in FIGS. 3 and 4, the headlamp 51 is implemented by attaching the lens 52 to a front surface of a lamp housing 53. A heat sink 54 is formed on an upper side of the lamp housing 53. Heat generated in the headlamp 51 is dissipated to the outside by the heat sink 54. The heat sink 54 of the headlamp 51 is accommodated inside the housing 61. An air intake hole 62 is formed in a lower surface of the housing 61. A heat exhaust hole 63 is formed from the upper surface to the rear surface of the housing 61. As the traveling wind flows from the air intake hole 62 to the heat exhaust hole 63, the heat sink 54 is exposed to the traveling wind, and the headlamp 51 is effectively cooled.

A wiring 57 extending from the headlamp 51 passes through the air intake hole 62 on the lower surface of the housing 61. A wiring 29 extending from the meter 28 passes through the heat exhaust hole 63 on the upper surface of the housing 61. In this way, through holes for the wirings 57 and 29 are used as the air intake hole 62 and the heat exhaust hole 63. Note that the air intake hole 62 and the heat exhaust hole 63 are larger than the wirings 57 and 29, respectively, and a sufficient gap is formed between the wirings 57 and 29 and each hole. Further, a gap 68 is formed between the lamp cover 41 and the housing 61, and the traveling wind also enters the housing 61 from the gap 68 between the lamp cover 41 and the housing 61.

The front fender 24 is located below the air intake hole 62 of the housing 61. Even when foreign matter such as water and mud is kicked up by the front wheel 23 (see FIG. 1), the front fender 24 prevents the foreign matter from entering the housing 61 through the air intake hole 62. The upper surface of the housing 61 is inclined downward toward the rear, and the meter 28 is attached to the inclined surface of the housing 61. The heat exhaust hole 63 is formed on the rear side of the upper surface of the housing 61, and the meter 28 is positioned above the heat exhaust hole 63. Even if foreign matter such as rain or snow falls from above, the meter 28 prevents the foreign matter from entering the housing 61 through the heat exhaust hole 63.

As described above, the groove portion 66 that is long in a front-rear direction is formed at the center in a vehicle width direction of the upper surface of the front fender 24. The groove portion 66 of the front fender 24 extends from a position forward of a front surface of the lamp cover 41 to a position rearward of the front surface of the lamp cover 41. A front end of the groove portion 66 is located outside the lamp cover 41, and a rear end of the groove portion 66 is located inside the lamp cover 41 and in front of the air intake hole 62 of the housing 61. Even if a gap between the lamp cover 41 and the front fender 24 is filled in order to prevent foreign matter from entering the housing 61 from the air intake hole 62, sufficient traveling wind is guided to the air intake hole 62 of the housing 61 by the groove portion 66 of the front fender 24.

A lower surface 45 of the lamp cover 41 faces a bottom surface of the groove portion 66 of the front fender 24. The lower surface 45 of the lamp cover 41 is inclined such that a rear end of the lower surface of the lamp cover 41 is lower than a front end of the lower surface. A part of the lower surface 45 of the lamp cover 41 enters the groove portion 66 of the front fender 24. The lower surface 45 of the lamp cover 41 is brought close to the bottom surface of the groove portion 66 of the front fender 24, and a passage for the traveling wind between the lamp cover 41 and the front fender 24 is narrowed. The traveling wind is guided into the groove portion 66 of the front fender 24 by the inclination of the lower surface 45 of the lamp cover 41 while intrusion of foreign matter due to the gap between the lamp cover 41 and the front fender 24 is prevented.

The slope 67 is formed on the rear side of the groove portion 66 of the front fender 24. The slope 67 is inclined so as to become higher toward the rear side, and a rear end of the slope 67 is located behind a lower surface front end 64 of the housing 61. A recessed portion 65 recessed upward is provided in the lower surface of the housing 61, and the air intake hole 62 is formed in a bottom surface of the recessed portion 65. The slope 67 of the front fender 24 fits into the recessed portion 65 of the housing 61, and a passage for the traveling wind between the slope 67 and the recessed portion 65 is narrowed. The traveling wind is guided into the air intake hole 62 by the inclination of the slope 67 while intrusion of foreign matter due to the gap between the recessed portion 65 and the slope 67 is prevented.

Figure 5A:
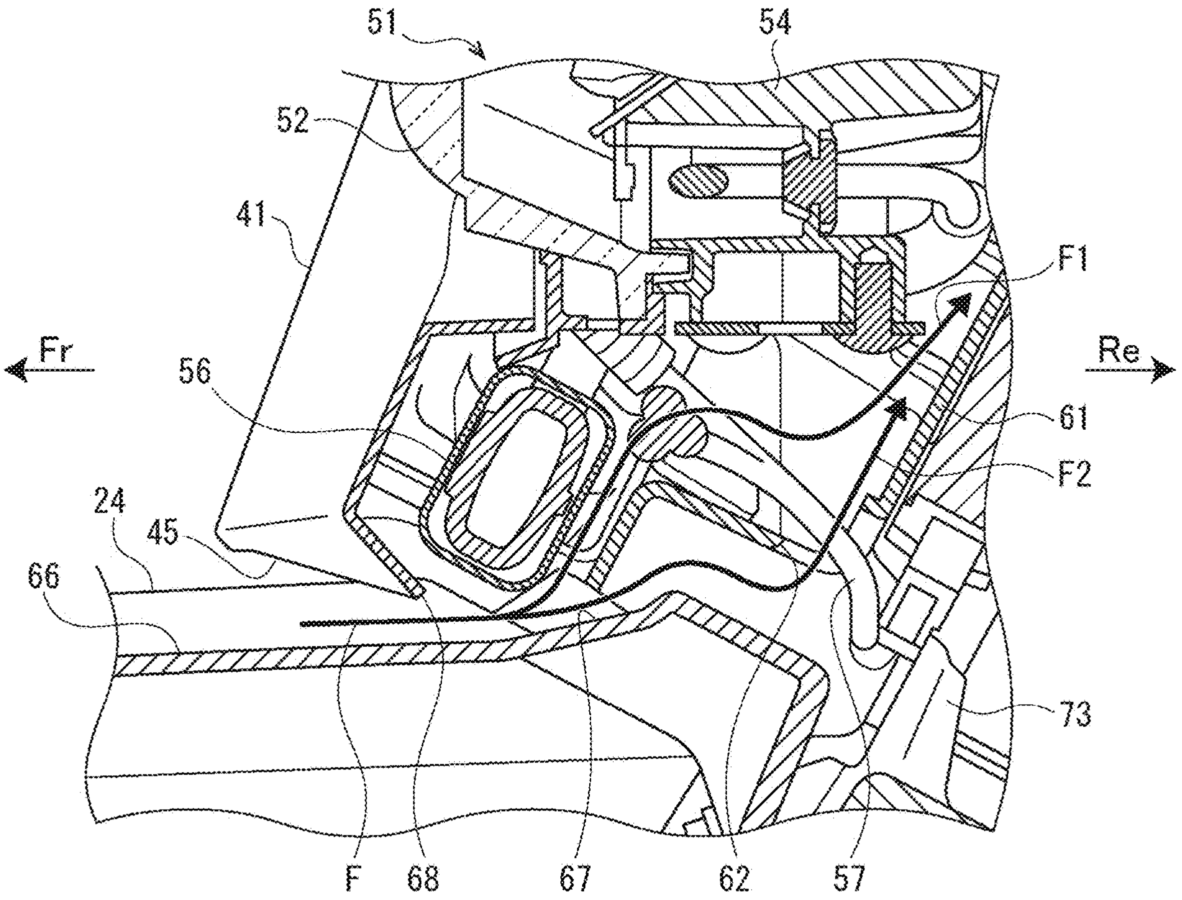
FIG. 5A is a view illustrating a heat exhaust structure for the headlamp according to the present embodiment.
Figure 5B:
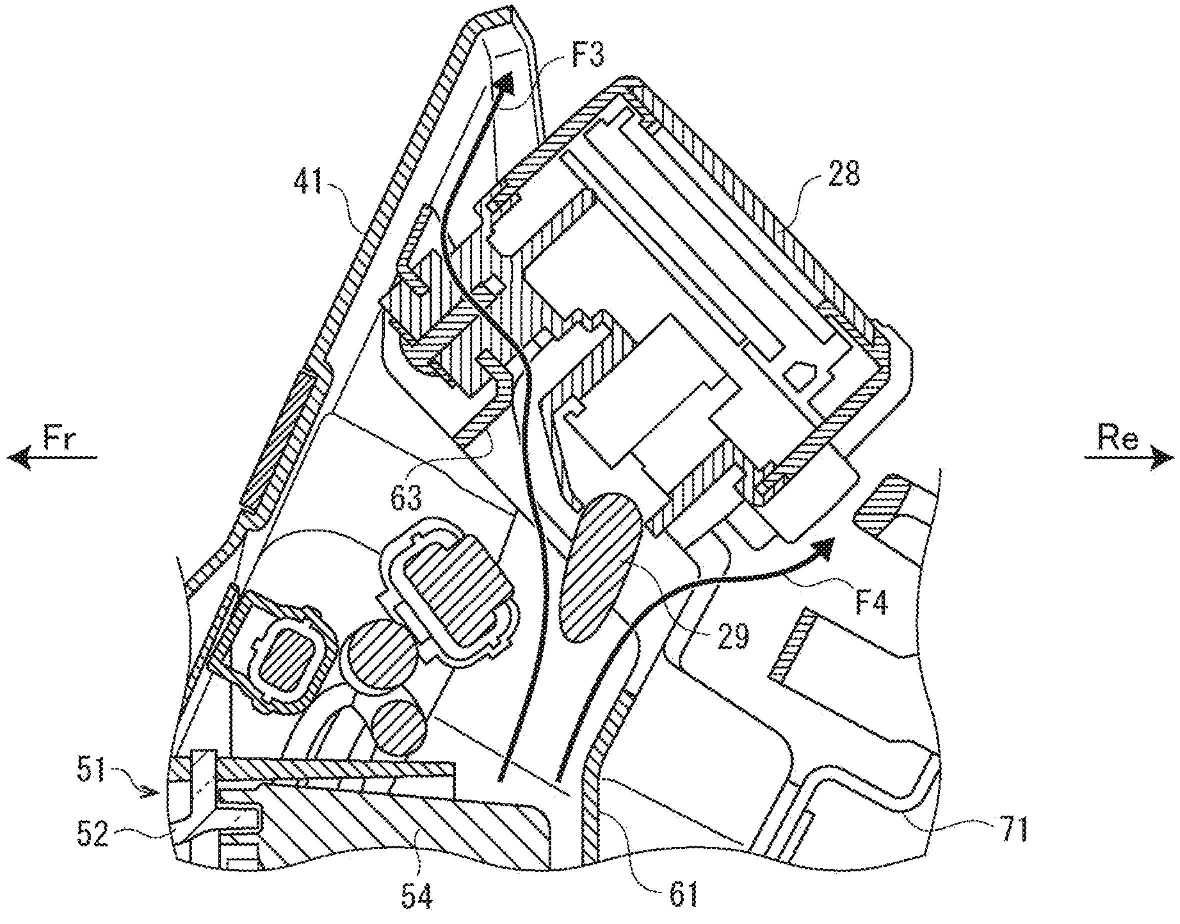
FIG. 5B is a view illustrating a heat exhaust structure for the headlamp according to the present embodiment.

A flow of the traveling wind will be described with reference to FIG. 5A and FIG. 5B. FIG. 5A and FIG. 5B are views illustrating the heat exhaust structure for the headlamp according to the present embodiment. FIG. 5A shows the flow of the traveling wind near the air intake hole, and FIG. 5B shows the flow of the traveling wind near the heat exhaust hole.

As shown in FIG. 5A, a passage for traveling wind is formed between the lamp cover 41 and the front fender 24. The groove portion 66 is formed in the upper surface of the front fender 24, and the lower surface 45 of the lamp cover 41 is inclined downward toward the rear. Traveling wind F flows along the front fender 24 and the lower surface 45 of the lamp cover 41, and the traveling wind F is taken into the inside of the lamp cover 41 through the groove portion 66 of the front fender 24. Since the lower surface 45 of the lamp cover 41 fits into the groove portion 66 of the front fender 24 to narrow the passage for the traveling wind F, foreign matter such as mud and water kicked up by the front wheel 23 (see FIG. 1) are less likely to enter the inside of the lamp cover 41.

When the traveling wind F enters the inside of the lamp cover 41, a part of the traveling wind F1 flows into the gap 68 between the lamp cover 41 and the housing 61. A connector 56 is positioned below the lens 52 of the headlamp 51, and the traveling wind F1 flows around the connector 56 and upward toward the heat sink 54 of the headlamp 51. The other traveling wind F2 flows into the air intake hole 62 of the recessed portion 65 of the headlamp 51 through the slope 67 of the front fender 24. The wiring 57 of the headlamp 51 passes through the air intake hole 62, and the traveling wind F1, F2 passes through a gap between the air intake hole 62 and the wiring 57 and flows upward toward the heat sink 54 of the headlamp 51.

When the traveling wind F1, F2 passes through the heat sink 54 of the headlamp 51, heat is exchanged between the heat sink 54 and the traveling wind F1, F2, and the headlamp 51 is effectively cooled. The air intake hole 62 of the housing 61 is covered by the front fender 24 from below, so that intrusion of foreign matter into the air intake hole 62 is prevented. Even if the air intake hole 62 for the headlamp 51 is formed in the housing 61, foreign matter is prevented from entering the air intake hole 62, so that foreign matter is prevented from adhering to the headlamp 51. Since the through hole for the wiring 57 is used as the air intake hole 62, there is no need to form a new hole in the housing 61.

As shown in FIG. 5B, below the meter 28, the heat exhaust hole 63 is formed from the upper surface to the rear surface of the housing 61. The heat exhaust hole 63 on the upper surface side of the housing 61 is covered by the meter 28 from above, and the heat exhaust hole 63 on the rear surface side of the housing 61 is opened rearward. A part of the traveling wind F3 flows from below the meter 28 toward the front through the heat exhaust hole 63 on the upper surface side of the housing 61, and the other part of traveling wind F4 flows toward the rear of the meter 28 through the heat exhaust hole 63 on the rear surface side of the housing 61. The wiring 29 of the meter 28 passes through the heat exhaust hole 63, and the traveling wind F3, F4 flows out through a gap between the heat exhaust hole 63 and the wiring 29.

When the traveling wind F3, F4 passes through the heat exhaust hole 63, the hot air in the housing 61 is pushed out to the outside by the traveling wind F3, F4. The heat exhaust hole 63 on the upper surface side of the housing 61 is covered by the meter 28, while the heat exhaust hole 63 on the rear surface side of the housing 61 is opened, so that the hot air in the housing 61 is exhausted to the outside while the intrusion of foreign matter into the heat exhaust hole 63 is prevented. Even if the heat exhaust hole 63 for the headlamp 51 is formed in the housing 61, foreign matter is prevented from entering the heat exhaust hole 63, so that foreign matter is prevented from adhering to the headlamp 51. Since the through hole for the wiring 29 is used as the heat exhaust hole 63, there is no need to form a new hole in the housing 61.

As described above, according to the heat exhaust structure for the headlamp 51, the traveling wind enters from the air intake hole 62 in the lower surface of the housing 61, and hot air is pushed out from the heat exhaust hole 63 in the upper surface of the housing 61, so that the heat exhaust performance of the headlamp 51 can be improved. Even if foreign matter such as water and mud is splashed up onto a front wheel 23, the housing 61 is protected from the foreign matter by the front fender 24. The front fender 24 prevents foreign matter from entering the housing 61 through the air intake hole 62, thereby preventing foreign matter from adhering to the headlamp 51.

In the present embodiment, the air intake hole and the heat exhaust hole are formed in the housing using the through hole for the wiring. Alternatively, the air intake hole and the heat exhaust hole may be formed in the housing separately from the through hole for the wiring.

Further, in the present embodiment, the groove portion and the slope are formed in the front fender. Alternatively, the groove portion and the slope may not be formed in the front fender as long as the traveling wind is directed to the air intake hole through the gap between the lamp cover and the front fender.

In the present embodiment, the heat exhaust hole is formed from the upper surface to the rear surface of the housing. Alternatively, the heat exhaust hole may be formed at least on the upper surface of the housing.

The heat exhaust structure according to the present embodiment is not limited to being used in the above-described straddle-type vehicle, and may be used in other types of straddle-type vehicles. The straddle-type vehicle is not limited to a general vehicle in which a driver rides on a seat in a posture straddling the seat, and includes a scooter-type vehicle in which the driver rides on the seat without straddling the seat.

As described above, a first aspect is a heat exhaust structure for a headlamp (51) that illuminates the front of a vehicle, the heat exhaust structure including: a lamp cover (41) configured to cover a periphery of a lens (52) of the headlamp; a housing (61) configured to cover a rear surface of the headlamp from a rear side; and a front fender (24) installed below the housing, in which an air intake hole (62) is formed in a lower surface of the housing, a heat exhaust hole (63) is formed in an upper surface of the housing, and the front fender (24) is positioned below the air intake hole. According to this configuration, traveling wind enters from the air intake hole in the lower surface of the housing, and hot air is pushed out from the heat exhaust hole in the upper surface of the housing, so that the heat exhaust performance of the headlamp can be improved. Even if foreign matter such as water and mud is splashed up onto a front wheel, the housing is protected from the foreign matter by the front fender. The front fender prevents foreign matter from entering the housing through the air intake hole, thereby preventing foreign matter from adhering to the headlamp.

A second aspect is directed to the first aspect, in which an upper surface of the front fender is formed with a groove portion (66) that extends from a position forward of a front surface of the lamp cover to a position rearward of the front surface of the lamp cover. According to this configuration, even if a gap between the lamp cover and the front fender is filled in order to prevent intrusion of foreign matter, sufficient traveling wind can be guided to the air intake hole of the housing by the groove portion of the front fender.

A third aspect is directed to the second aspect, in which a lower surface (45) of the lamp cover faces the groove portion of the front fender, and the lower surface of the lamp cover is inclined such that a rear end of the lower surface of the lamp cover is lower than a front end of the lower surface. According to this configuration, traveling wind is guided into the groove portion of the front fender by the inclination of the lower surface of the lamp cover while intrusion of foreign matter due to the gap between the lamp cover and the front fender is prevented.

A fourth aspect is directed to the second aspect or the third aspect, in which a slope (67) that becomes higher rearward is formed on a rear side of the groove portion of the front fender, and a rear end of the slope of the front fender is located behind a front end (64) of the lower surface of the housing. According to this configuration, the traveling wind is guided to the air intake hole of the housing by the slope of the front fender, and the heat exhaust performance of the headlamp can be improved.

A fifth aspect is directed to the fourth aspect, in which the air intake hole is formed in a recessed portion (65) provided in the lower surface of the housing, and the slope of the front fender fits into the recessed portion of the housing. According to this configuration, the traveling wind is guided into the air intake hole by the inclination of the slope while intrusion of foreign matter due to the gap between the recessed portion and the slope is prevented.

A sixth aspect is directed to any one of the first to fifth aspects, and further includes a meter (28) attached to the upper surface of the housing, in which the meter is located above the heat exhaust hole. According to this configuration, even if foreign matter such as rain or snow falls from above, the meter prevents the foreign matter from entering the housing through the heat exhaust hole.

A seventh aspect is directed to the sixth aspect, in which the heat exhaust hole is formed from the upper surface to a rear surface of the housing below the meter. According to this configuration, it is possible to exhaust the hot air in the housing to the outside while preventing intrusion of foreign matter into the heat exhaust hole by the meter.

Although the present embodiment has been described, a part or all of the above-described embodiment and a modification may be combined as another embodiment.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A heat exhaust structure for a headlamp configured to illuminate the front of a vehicle, the heat exhaust structure comprising:

a lamp cover configured to cover a periphery of a lens of the headlamp;

a housing configured to cover a rear surface of the headlamp from a rear side; and a front fender installed below the housing, wherein an air intake hole is formed in a lower surface of the housing, a heat exhaust hole is formed in an upper surface of the housing, the front fender is positioned below the air intake hole, the air intake hole opens downward and is located rearward of a front surface of the lamp cover, wherein an upper surface of the front fender is formed with a groove portion that extends from a position forward of a front surface of the lamp cover to a position rearward of the front surface of the lamp cover, wherein a lower surface of the lamp cover faces the groove portion of the front fender, wherein the lower surface of the lamp cover is inclined such that a rear end of the lower surface of the lamp cover is lower than a front end of the lower surface, and wherein the lower surface of the lamp cover fits into the groove portion of the front fender to narrow a passage for traveling wind.

2. The heat exhaust structure for a headlamp according to claim 1, further comprising:

a meter attached to the upper surface of the housing, wherein the meter is located above the heat exhaust hole.

3. The heat exhaust structure for a headlamp according to claim 2, wherein the heat exhaust hole is formed from the upper surface to a rear surface of the housing, below the meter.

4. A heat exhaust structure for a headlamp configured to illuminate the front of a vehicle, the heat exhaust structure comprising:

a lamp cover configured to cover a periphery of a lens of the headlamp;

a housing configured to cover a rear surface of the headlamp from a rear side; and a front fender installed below the housing, wherein an air intake hole is formed in a lower surface of the housing, a heat exhaust hole is formed in an upper surface of the housing, the front fender is positioned below the air intake hole, the air intake hole opens downward and is located rearward of a front surface of the lamp cover, wherein an upper surface of the front fender is formed with a groove portion that extends from a position forward of a front surface of the lamp cover to a position rearward of the front surface of the lamp cover, wherein a slope that becomes higher rearward is formed on a rear side of the groove portion of the front fender, wherein a rear end of the slope of the front fender is located behind a front end of the lower surface of the housing wherein the air intake hole is formed in a recessed portion provided in the lower surface of the housing, wherein the slope of the front fender fits into the recessed portion of the housing wherein the slope of the front fender is formed to be higher toward the rear at a position rearward of a front end of the lower surface of the housing, wherein, in a side view, the recessed portion of the housing is provided in a shape recessed upward with respect to the front end of the lower surface of the housing, and wherein, in the side view, the rear end of the slope is positioned forward of a rear end of the recessed portion and enters the recessed portion of the housing.

5. A heat exhaust structure for a headlamp configured to illuminate the front of a vehicle, the heat exhaust structure comprising:

a lamp cover configured to cover a periphery of a lens of the headlamp;

a housing configured to cover a rear surface of the headlamp from a rear side; and a front fender installed below the housing, wherein an air intake hole is formed in a lower surface of the housing, a heat exhaust hole is formed in an upper surface of the housing, the front fender is positioned below the air intake hole, the air intake hole opens downward and is located rearward of a front surface of the lamp cover, wherein an upper surface of the front fender is formed with a groove portion that extends from a position forward of a front surface of the lamp cover to a position rearward of the front surface of the lamp cover, wherein a lower surface of the lamp cover faces the groove portion of the front fender, wherein the lower surface of the lamp cover is inclined such that a rear end of the lower surface of the lamp cover is lower than a front end of the lower surface, and wherein, in a side view, a part of the lower surface of the lamp cover extends below an upper edge of the front fender.

* * * * *